(12) United States Patent
Fogt

(10) Patent No.: US 8,553,936 B2
(45) Date of Patent: Oct. 8, 2013

(54) GAZE TRACKING MEASUREMENT AND TRAINING SYSTEM AND METHOD

(75) Inventor: Nicklaus F. Fogt, Columbus, OH (US)

(73) Assignee: The Ohio State University, Columbus, OH (US)

( * ) Notice: Subject to any disclaimer, the term of this patent is extended or adjusted under 35 U.S.C. 154(b) by 147 days.

(21) Appl. No.: 13/254,928

(22) PCT Filed: Mar. 3, 2010

(86) PCT No.: PCT/US2010/026093
§ 371 (c)(1),
(2), (4) Date: Oct. 25, 2011

(87) PCT Pub. No.: WO2010/102037
PCT Pub. Date: Sep. 10, 2010

(65) Prior Publication Data
US 2012/0051597 A1 Mar. 1, 2012

Related U.S. Application Data

(60) Provisional application No. 61/156,978, filed on Mar. 3, 2009.

(51) Int. Cl.
*G06K 9/00* (2006.01)
*A63B 67/02* (2006.01)

(52) U.S. Cl.
USPC .......................... 382/103; 382/291; 473/169

(58) Field of Classification Search
USPC ......... 382/100, 103, 106–107, 122, 155, 168, 382/173, 181, 232, 254, 274, 291, 305, 312, 382/321; 434/29; 473/199, 169; 324/207.17; 351/209; 359/630; 342/359

See application file for complete search history.

(56) References Cited

U.S. PATENT DOCUMENTS

| | | | |
|---|---|---|---|
| 5,744,953 A * | 4/1998 | Hansen | 324/207.17 |
| 6,752,498 B2 | 6/2004 | Covannon et al. | |
| 7,009,561 B2 | 3/2006 | Menache et al. | |
| 7,197,165 B2 | 3/2007 | Ryan | |
| 7,306,337 B2 | 12/2007 | Ji et al. | |
| 8,328,653 B2 * | 12/2012 | Lock | 473/199 |
| 2003/0218672 A1 | 11/2003 | Zhang et al. | |
| 2004/0174496 A1 | 9/2004 | Ji et al. | |
| 2006/0068365 A1 * | 3/2006 | Smith | 434/29 |
| 2007/0057842 A1 * | 3/2007 | Coleman et al. | 342/359 |
| 2008/0002262 A1 * | 1/2008 | Chirieleison | 359/630 |
| 2008/0062383 A1 * | 3/2008 | Endrikhovski et al. | 351/209 |

\* cited by examiner

*Primary Examiner* — Seyed Azarian
(74) *Attorney, Agent, or Firm* — Standley Law Group LLP

(57) ABSTRACT

Many athletic endeavors require focus on a moving object and subsequent coordination of bodily movement either in response to movement of the object or in an attempt to manipulate the object. Coordinated movement of the head and eyes can be improved through training when errors in gaze/head movement-coordination are identified. There exists a need for systems and methods capable of tracking and coordinating change in position of, for example, the head relative to a participant's gaze, and then to provide feedback on a participant's error in tracking moving objects. Exemplary embodiments of the present invention relate to the technology of gaze tracking and more particularly to the application of gaze tracking technology to aid in the development of head-and-eye-movement coordination.

15 Claims, 2 Drawing Sheets

GAZE TRACKING MEASUREMENT AND TRAINING SYSTEM AND METHOD

CROSS-REFERENCE TO RELATED APPLICATIONS

This non-provisional patent application claims the benefit of priority to U.S. Provisional Patent Application No. 61/156,978, filed Mar. 3, 2009, which is hereby incorporated by reference in its entirety.

TECHNICAL FIELD

Exemplary embodiments of the present invention relate to the technology of gaze tracking and more particularly to the application of gaze tracking technology to aid in the development of head-and-eye-movement coordination.

BACKGROUND AND SUMMARY OF THE INVENTION

Many athletic endeavors require focus on a moving object (usually a ball) and subsequent coordination of bodily movement either in response to movements of the object or in an attempt to manipulate the object. In baseball for instance, a batter must focus on a ball traveling towards them while coordinating the movements required for their swing. It is believed that improving the athlete's ability to track the object of their respective sport will improve athletic performance.

Gaze defines a subject's current line of sight or fixation point. The fixation point is defined as the intersection of the line of sight with the surface of the object being viewed. In recent years significant research has been devoted to studying gaze and eye position relative to performance in activities that require hand-eye coordination. Much of the research has focused on the use of gaze tracking in athletic training.

One area of research currently being conducted is the relationship of eye gaze time, targeting and performance levels. On-going research on targeting in sports is revealing intriguing secrets of how elite athletes utilize their eyes to target in a number of sports including baseball, golf, hockey and tennis. Specifically, this research informs us where to best target with our eyes and how long to actually fix our gaze on our target. And, the research is providing insight in targeting proficiency that will allow more novice players to alter their targeting to improve performance.

Research has shown that athletes that perform at a high level are better able to coordinate eye gaze and head movement, or rather coordinate them in a different (or more optimal) manner than their less-accomplished counterparts. It is believed, with an effective system for tracking the two movements (gaze and head movement) coupled with correlating the movements to the actual position of a moving object (e.g., a tennis ball), that performance in sports such as baseball and tennis can be improved by training athletes to coordinate these movements in an optimal fashion.

Existing techniques for eye gaze tracking can be divided into video-based techniques and non-video-based techniques. The non-video-based methods typically use special contacting devices attached to the skin or eye to obtain the subject's gaze. Thus, the non-video-based methods are intrusive and interfere with the subject. In contrast, video-based gaze tracking methods have the advantage of being unobtrusive and comfortable for the subject during the process of gaze estimation. Unfortunately, current video-based gaze tracking methods have significant shortcomings. For example, some existing techniques which relate gaze to head orientation lack sufficient accuracy. Other existing techniques which relate gaze to eye orientation require a static head which is a significant constraint imposed on the subject. Another serious problem with the existing eye and gaze tracking systems is the need to perform a rather cumbersome calibration process for each individual.

If one is to develop a system to evaluate head movement and gaze tracking in the realm of athletic training, the ability to track and analyze these data simultaneously, as well as while the subject is performing the required task, is needed. Thus, a system that is not overly cumbersome, and allows freedom of motion while monitoring and recording the necessary movements, is needed.

In recent years, research has indicated that elite athletes in sports that require focus on an object that is rapidly approaching the athlete (such as tennis and baseball) coordinate both their head and eye movements in a similar and predictable fashion, and that less accomplished athletes in these sports tend to utilize a different combination of head movement and eye gaze coordination. Researchers then deduced that training in the realm of gaze tracking could improve athletic performance.

The field of gaze tracking has been studied for many years, mainly in an effort to improve human-computer interface. Much of the technology has developed around so-called glint tracking. Glint refers to the reflection off of the surface of the eye of directed light. The shape of the light source creates a recognizable pattern on the surface of the eye which can be tracked and, using simple concepts from the field of optics, can be used to determine the direction of the subject's gaze and their point of regard. Glint tracking in its most basic form involves a light focused on the subject's eye, a video recording device to monitor the shape and position of the glint, and a software program that is able to analyze the video recording and calculate changes in the shape and position of the glint and correlate that to eye position and point of regard.

One of the first obstacles to overcome when developing a glint tracking system is that of size/portability. In order to be most effective, the light for the glint tracking and the video recording device must be positioned close to the eye or interference from other objects will become a problem. Additionally, more accurate measurements may be made while in close proximity to the eye. This obstacle is often addressed by attaching the light source and video camera to a set of goggles or some type of apparatus that fits over the crown of the head and projects over the front of the head, giving the lights and camera access to the eyes. An example of an apparatus that addresses these issues is manufactured by ISCAN Incorporated, 89 Cambridge Street Burlington, Mass. 01803.

Another obstacle is effective tracking of movements of the head. Systems of the past required a clear line of sight between the sensor and the transmitter due to the fact that they employed light or sound energy to track motion. Data transmission would be disrupted, in devices that employ light or sound energy to track motion, if a clear line of sight was not maintained. This results in suboptimal or limited adaptability to activities that require the motion of other objects or appendages of the subject (i.e., movement of the subject's hand during tracking would impede the tracking capabilities or disrupt data acquisition thus restricting the system to a limited set of applications).

One solution that those interested in tracking body motion developed, while avoiding the drawbacks of light or sound-based technologies, was to create a magnetic field about the object to be tracked. When the participant's head is turned within the generated magnetic field, a signal is induced in the receiver that is proportional to the amount of head turn. This signal may be read by a computer. One apparatus that uses this technology is manufactured by Ascension Technology Corp. P.O. Box 527 Burlington, Vt. 05402.

An additional variable in determining whether a test subject is appropriately tracking a moving object, is the position of the "pitched object," whether a baseball, a tennis ball, or any other object that a test subject might be attempting to track. It is advantageous to reduce the amount of variability in, or at least to be able to have some control over, the position and speed of the pitched object. This can be accomplished by using a pitching machine; these are available for a number of sports including baseball, softball, tennis, and football among others. The basic idea is that the ball of the particular sport is pitched by the machine using either mechanical means or compressed gas. The fact that most of these machines have speed and angle adjustments allows the trainer to reduce the amount of variability that would otherwise be present if the pitched object was delivered by a human. An example of a machine developed for use in baseball training is available from Accelerated Baseball Tech. Inc. 28500 West Heritage Oak Road Barrington, Ill. 60010.

Another obstacle in developing a system for effective training of head movement and gaze tracking is the ability to coordinate the data from these sources. The data regarding gaze, head motion and the relative position of the projected object need to be analyzed at specific points in time in order to determine how well the participant is tracking the projected object, or to detect any errors in gaze position.

These and other unmet needs of the known art may be met by a system and method as described in more detail below. For instance, one example of the present invention is a method for improving visual tracking ability comprising the steps of: providing a machine for projecting an object generally toward a participant; projecting the object toward a participant; determining the participant's tracking ability; and providing feedback regarding the participant's tracking ability. Another exemplary embodiment of the present invention is a system for improving the visual tracking ability of a participant. An example of a system may comprise: a machine for projecting an object at the participant; a means for tracking the gaze of the participant; a means for tracking the head movement of the participant; and a means for tracking the relative position of the projected object. Yet another embodiment of a system for improving the visual tracking ability of a participant comprises: a machine adapted to project an object at the participant; at least one camera adapted to be utilized in such a way as to track the gaze of the participant; at least one camera adapted to be used to track the position of the projected object relative to the participant; an apparatus adapted to utilize an induced magnetic field to track the movement of the participant's head; and a computer system capable of receiving data from the various tracking apparatuses and, via computer readable instructions, correlating the data with respect to time. An example of a computer system may comprise: one or more processors or processing units; a system memory; a system bus that may couple or associate various system components such as the processor and the various tracking apparatuses to the system memory; and a monitor for displaying the coordinated data. Other embodiments may utilize some or all of the aforementioned features. In view of these exemplary embodiments, still other variations are possible such as described below.

BRIEF DESCRIPTION OF THE DRAWINGS

A better understanding of the exemplary embodiments of the invention will be had when reference is made to the accompanying drawings, wherein identical parts are identified with identical reference numerals, and wherein.

DETAILED DESCRIPTION OF EXEMPLARY EMBODIMENT(S)

Figure 1:
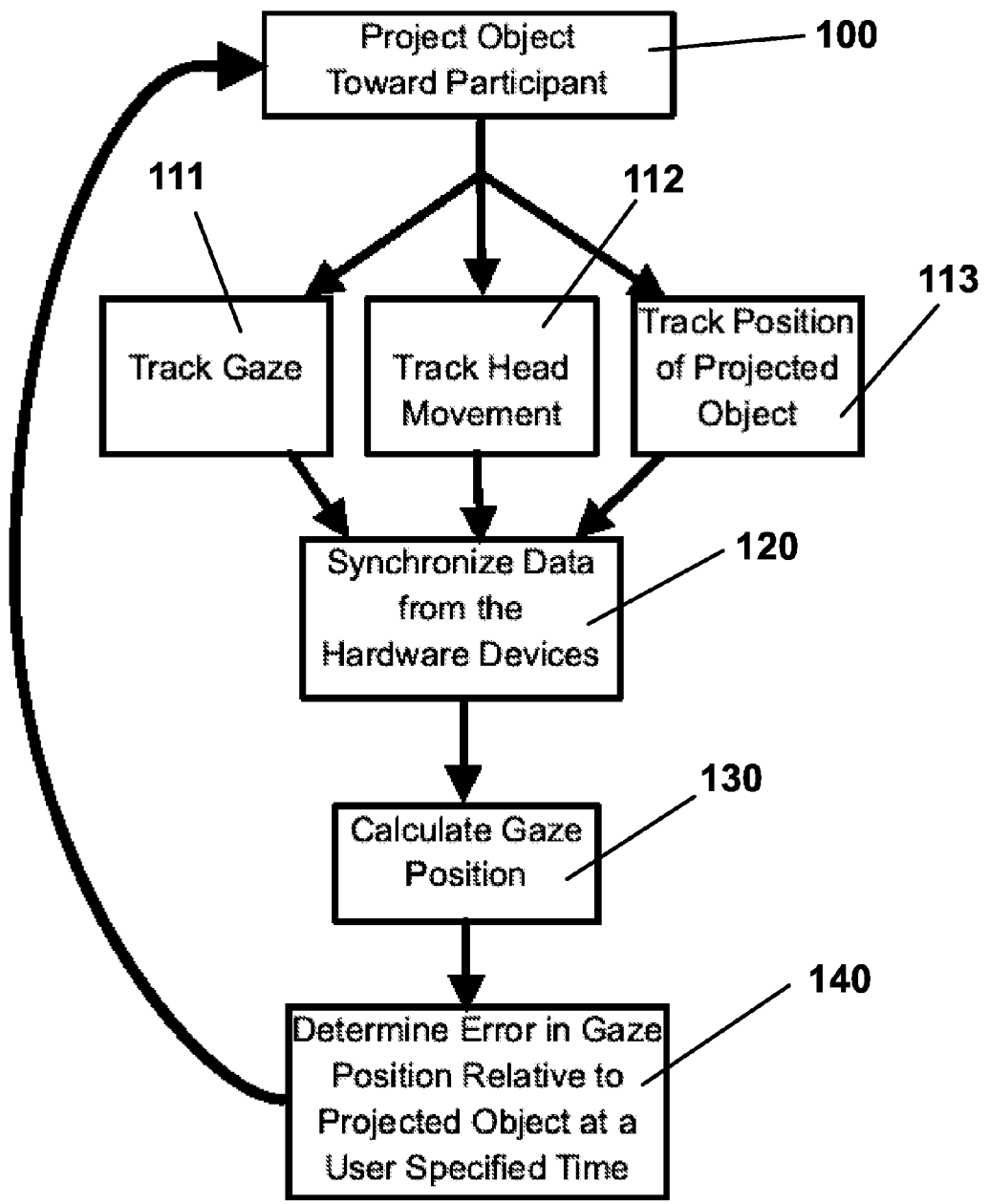
FIG. 1 is a block diagram representing an embodiment of the present invention. The block diagram shows a synchronization step after the various tracking means have recorded the motion of their subjects. This may be accomplished by a software program designed to take input from the various tracking implements and correlate the data on a time course. In the alternative, the software may be designed to display the error in gaze tracking during the entire time course of the flight of the projected object.

FIG. 1 is a block diagram illustrating sequential steps of an embodiment of a head and gaze tracking system. The initial step 100 is to project the object toward the participant. Next, steps 111, 112, and 113 may be implemented substantially in concert. That is, the gaze of the participant, the participant's head movement, and the position of the projected object may be recorded simultaneously. After steps 111, 112, and 113 are complete, the data from the relative hardware devices is synchronized in step 120. This synchronization step may be completed by a computer or other suitable device. Once the synchronization is complete, the gaze of the participant is calculated in step 130. In step 140, the computer then determines the error in the participant's gaze relative to the actual position of the projected object. This error may be calculated for specific times predetermined by the user or may optionally be calculated for the entire path of the projected object. The data output may then be displayed or recorded for providing feedback to the participant. The process may then be repeated after feedback and corrective measures are taken to improve the participant's reaction.

The concept embodied by examples of the present application may be implemented in a number of different ways. The following describes examples of an embodiment. Exemplary embodiments may, for example, track the motion of the participant's head, the gaze of the participant, and the relative position of a pitched ball/object, and then coordinate that data and provide feedback (e.g., substantially instantaneous feedback) to the participant, or in the alternative provide information to a trainer or coach for interpretation and subsequent feedback to the participant, in order to train the participant to more effectively track moving objects. In order to track these movements, a number of tracking apparatuses may be implemented.

Numerous technologies have been developed for tracking the motion of a participant's head. Many of these suffer from significant drawbacks. Currently, the use of a DC induced magnetic field shows significant promise for tracking the relative motion of a participant's head. The head-tracking apparatus first generates a magnetic field about the head of the participant. Subsequently, when the participant moves his or her head, the apparatus is designed to detect changes in the magnetic field created by the movement. The apparatus then communicates with a processing unit (perhaps through an A/D convertor) to put the data in a form which can be communicated directly to the participant or correlated with other data (e.g., the relative position of a pitched object, or the gaze of the participant) to provide a snapshot of the participant's object-tracking ability for analysis and substantially instantaneous feedback, or in the alternative delayed feedback by, for example, a coach or trainer.

In addition to tracking the relative motion of the participant's head during a training exercise, an exemplary embodiment may also track the gaze of the participant during the exercise. Gaze tracking has been studied for a number of different applications in the past and may be accomplished in a number of different ways. One method for tracking the gaze of a participant during this type of object-tracking exercise is to position at least one camera near the participant's eyes. This can be accomplished by attaching the at least one camera to an apparatus that may be worn on the participant's head. A light source then creates a glint on the participant's eyes. The camera records the position, shape, and size of the glint on the participant's eyes. The camera then sends the recording of the glint information to a processing unit which tracks the change in glint over time. Those skilled in the art may recognize that computer readable instructions are available to take the raw glint data from the at least one camera and calculate the gaze or fixation point of the participant. Once this is done, the data from the gaze tracking apparatus may be correlated with that of the other tracking apparatuses.

The third object that may be tracked is the pitched object. This tracking may be accomplished by using a simple one camera tracking system, where the camera is positioned to observe the entire path of the pitched object in such a way that the distance from the participant may be calculated. Or alternatively, if more detailed tracking is desired or necessitated, the object tracking may be performed by several cameras, which may follow the entire path or a relevant portion of the path of the pitched object from differing angles, or perhaps a series of cameras all observing and recording segments of the path of the pitched object, provided that the information from the plurality of cameras may be coordinated to produce a coherent data stream that may be correlated to the other tracking data. It should be noted that although the term camera is used throughout, this should not be construed to limit the scope of the present invention; rather the use of the term camera is meant to encompass the concept of a device capable of capturing and recording observable visual information, and (in the case of an exemplary embodiment of the present invention) communicating this information to a processing unit of, for example, a computer.

In an exemplary embodiment, the movement of a participant's head and the position of their eyes may also be tracked. This information is correlated with simultaneous data tracking the position of a moving ball. The correlated data then represents an objective measure of the participant's ability to track objects. This data may then be used to train a participant to more effectively track moving objects. This may be accomplished by successive iterations of gaze tracking and training.

In one exemplary embodiment, the hardware may comprise a pitching machine such as those marketed by Accelerated Baseball Technologies Incorporated, an eye-tracker designed for sports studies such as that marketed by ISCAN Incorporated, a head tracker such as that marketed by Ascension Technology Corporation, and an analog to digital converter computer board such as that sold by Measurement Computing.

In an exemplary embodiment, the software that integrates the output from the various tracking means is able to synchronize the data obtained from a serial port at a relatively low recording frequency (e.g., about 250 Hz) with that acquired at a much higher recording frequency. The software may calculate the gaze position of the eye at any user-specified time after the object is released. The software may calculate the error in gaze position of the eye compared to the position of the released ball at the user specified time. The software may plot the eye, head, and ball position as a function of time to demonstrate overall coordination of the participant.

In an exemplary embodiment, an example of an ISCAN eye-tracker (120 Hz or 240 Hz output rate) may be an infrared system comprising two small cameras mounted on goggles and adapted to be above the participant's eyes. A signal output from the cameras may be an analog signal proportional to eye position. The data from the eye-tracker may be fed continuously from a computer running the necessary software into an analog to digital converter in the computer running the head-tracking means. The head-tracking means may comprise a transmitter that induces a low-power DC magnetic field around the participant, and a receiver attached to, for example, a pair of goggles. When the participant's head (and therefore the receiver) are turned within the magnetic field, a signal is then induced in the receiver that is proportional to the amount of head turn. This signal may be read through a serial port of a computer attached to the head tracker.

The machine which projects an object at the participant may use, for example, compressed air or rotating wheels to "throw" objects at the participant. The means may achieve speeds equal to those seen in common sports such as tennis or baseball (60-100 mph for example). Preferably, the machine is accurate as to the lateral position of the projected object. A laser or infrared photocell detection arrangement may be used to determine the time that the object exits the projecting means. When the object interferes with the beam of the detection mechanism a signal is sent to a receiving computer for appropriate synchronization of the tracking means. In an exemplary embodiment, the object detection should preferably be recorded at a high rate (e.g., ~1000 Hz) in order to reliably detect the exit of the object.

In an exemplary embodiment, the data collection software may utilize an analog to digital converter "background function." While rotational signals (horizontal, vertical, torsional) from the various tracking means are recorded via a serial port, whereas the analog signals may be recorded in parallel fashion using the "background" function. In this manner, the head tracking means and the count (the point # taken from the A/D converter, not the actual data value) are recorded in synchronous fashion. The data from the photocell and the eye-tracking means may be recorded separately from the head-tracking means. The data analysis software may then create an array of data from the head-tracking means, filling in any gaps in the movement data. The software may then find the corresponding point when the object exits the projecting means. The software may then identify any change in gaze position after the object has been projected. A user may vary the time at which a calculation is made, and the code may be run multiple times if desired. Finally, an error in gaze position may be calculated and displayed. Optionally, the error may be calculated and displayed for an entire range of time, perhaps the entire path of the projected object, allowing for user feedback throughout the period of observation of the projected object.

The coordination of the data from the various tracking means may be accomplished through the use of a computer system in the form of a computer. The components of the computer may include but are not limited to one or more processors or processing units, a system memory, and a system bus that couples or associates various system components including the processor to the system memory.

The system bus may represent one or more of any of several types of bus structures, including a memory bus or memory controller, a peripheral bus, an accelerated graphics port, and a processor or local bus using any of a variety of bus architectures.

Figure 2:
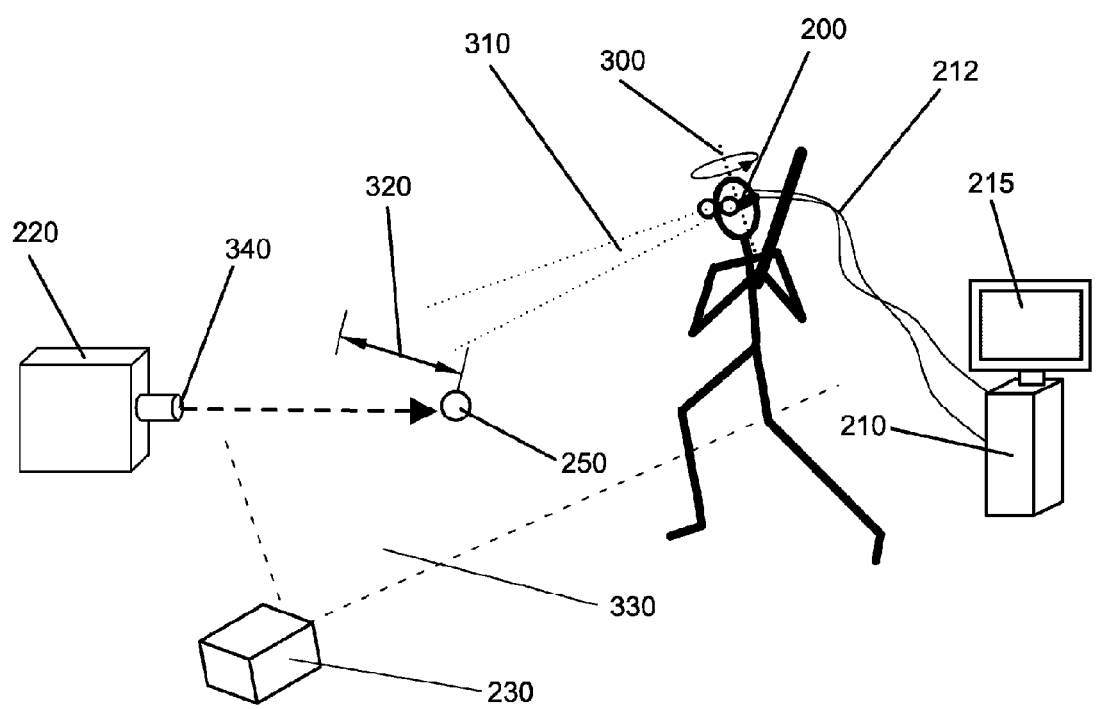
FIG. 2 is a representation of an example of a system for projecting an object at a participant and tracking the participant's gaze and head movement in reaction to the object.

FIG. 2 shows an embodiment of a gaze and head tracking system. The gaze 310 of a participant may be tracked via a glint tracking device 200, here represented by a goggle apparatus. Optionally, the head tracking apparatus may be fixed on the goggles 200. The head tracking apparatus monitors the change in position of the head of the participant 300. All of the tracking means may be connected to or in communication with a computer 210 with a monitor 215 for displaying computed results. In the drawing, the head and gaze tracking means are connected via wires 212. However, optionally all of the tracking apparatuses may be wirelessly connected to the computer. The system includes a machine for projecting 220, which projects objects 250 towards the participant. As the object 250 leaves the projecting machine 220, the point in time that the object leaves the machine may be determined at the exit 340. This may be accomplished by any suitable motion tracking means. As the object 250 travels toward the participant, its motion (the dotted arrow line) may be recorded by a recording means (for example, a video camera) 230, with a viewable area 330 for recording the object. As the position of the object and the gaze and head movement of the participant are tracked, the computer may calculate the error represented here by 320. It is apparent from the drawing that the error will have 3 dimensions, although only two are shown for ease of illustration. Additionally, the computer may calculate the error 320 for more than one point along the path of the object.

An example of a computer system may include a variety of computer readable media. Such media may be any available media that is accessible by computer and includes both volatile and non-volatile media, and removable and non-removable media. The system memory may include computer readable media in the form of volatile memory, such as random access memory (RAM), and/or non-volatile memory, such as read-only memory (ROM). A computer may also include other removable/non-removable, volatile/non-volatile computer storage media.

A user may enter commands and information into the computer via input devices such as a keyboard and a pointing device (e.g., a "mouse"). Other input devices (not shown specifically) may include a microphone, joystick, game pad, satellite dish, serial port, scanner, and the tracking devices described herein. These and other input devices may be connected to the processing unit via input/output interfaces that are coupled to or in communication with the system bus, but may be connected by other interface or bus structures, such as a parallel port, game port, or a universal serial bus (USB).

A monitor or other type of display device may also be connected to the system bus via an interface, such as a video adapter. In addition to the monitor, other output peripheral devices may be connected to a computer via input/output interfaces.

The computer may operate in a networked environment using logical connections to one or more remote computers, such as a remote computing device. By way of example, the remote computing device may be a personal computer, portable computer, a server, a router, a network computer, a peer device or other common network node, and the like. An example of the remote computing device is illustrated as a portable computer that can include many or all of the elements and features described herein relative to computer system. Furthermore, a computer and any other system components may communicate in any suitable fashion (e.g., directly coupled or wirelessly).

Turning to the drawings for an understanding of the process involved, FIG. 1 shows a block diagram representation of an embodiment of the present invention. In one exemplary embodiment, the software for the synchronization and coordination of the data from the various tracking means may allow for display of the data throughout the entire flight-time of the projected object.

Any embodiment of the present invention may include any of the optional or preferred features of the other embodiments of the present invention. The exemplary embodiments herein disclosed are not intended to be exhaustive or to unnecessarily limit the scope of the invention. The exemplary embodiments were chosen and described in order to explain the principles of the present invention so that others skilled in the art may practice the invention. Having shown and described exemplary embodiments of the present invention, those skilled in the art will realize that many variations and modifications may be made to the described invention. Many of those variations and modifications will provide the same result and fall within the spirit of the claimed invention. It is the intention, therefore, to limit the invention only as indicated by the scope of the claims.

What is claimed is:

1. A method for improving visual tracking ability comprising:
   providing a machine for projecting an object generally toward a participant;
   providing at least one camera for tracking gaze of the participant;
   providing means for tracking head movement of the participant;
   providing means for tracking a position of the projected object;
   projecting said object toward the participant;
   tracking the position of the projected object;
   determining the participant's tracking ability, including the step of correlating the data produced, at a specific point in time, by the at least one camera, the head tracking means, and the object tracking means; and
   providing feedback regarding the participant's tracking ability;
   wherein the correlated data is displayed to aid in providing either substantially instantaneous feedback, or information for interpretation by another person and subsequent feedback, to the participant.

2. The method of claim 1, further including the step of tracking the gaze of the participant.

3. The method of claim 2, wherein the participant's gaze is tracked while the object is projected toward the participant.

4. The method of claim 1, further including the step of tracking the head movement of the participant.

5. The method of claim 4, wherein the movement of the participant's head is tracked via disruption of a magnetic field generated about the participant.

6. The method of claim 5, wherein the magnetic field is induced by a direct current (DC) source.

7. The method of claim 6, wherein the participant's head movement and gaze are tracked simultaneously while an object is projected toward the participant.

8. The method of claim 1, wherein the data produced by the means for tracking the gaze of the participant; the means for tracking the head movement of the participant; and the means for tracking the position of a projected object, are all recorded.

9. The method of claim 1, wherein the object is adapted to be projected at various speeds and trajectories.

10. A system for improving the visual tracking ability of a participant comprising:
    a machine for projecting an object at the participant;
    at least one camera for tracking gaze of the participant;

means for tracking head movement of the participant;
means for tracking relative position of the projected object;
means for determining the participant's tracking ability by correlating data produced, at a specific point in time, by the at least one camera, the head tracking means, and the object tracking means; and
means for providing feedback regarding the participant's tracking ability, said means adapted to display the correlated data to aid in providing either substantially instantaneous feedback, or information for interpretation by another person and subsequent feedback, to the participant.

11. The system of claim 10, wherein the means for determining the participant's tracking ability and the means for providing feedback are comprised of a processing component in the form of a computer system capable of receiving data from the various tracking means and, via computer readable instructions, correlating the data with respect to time;
said computer system comprising:
one or more processors or processing units;
a system memory;
a system adapted to couple or associate various system components including the processor and the various tracking means to the system memory; and
a display means, through which the data, after being correlated, is displayed for analysis and feedback.

12. The system of claim 10, wherein the machine for projecting an object is capable of projecting an object at variable directions and speeds.

13. The system of claim 10, wherein the means for tracking the gaze of the participant is adapted to track gaze via eye-glint position.

14. The system of claim 10, wherein the means for tracking the head movement of the participant is adapted to utilize a magnetic field to track head movement, wherein the magnetic field is adapted to be generated by a direct current (DC) source.

15. A system for improving the visual tracking ability of a participant comprising:
a machine adapted to project an object at the participant;
at least one camera, adapted to be utilized in such a way as to track gaze of the participant;
means adapted to be used to track position of the projected object relative to the participant;
an apparatus adapted to utilize an induced magnetic field to track movement of the participant's head; and
a computer system capable of receiving data from the various tracking apparatuses and, via computer readable instructions, correlating the data with respect to time;
said computer system comprising:
one or more processors or processing units;
a system memory;
a system adapted to couple or associate various system components including the processor and the various tracking apparatuses to the system memory; and
a monitor for displaying the correlated data;
wherein the correlated data is adapted to be displayed to aid in providing either substantially instantaneous feedback, or information for interpretation by another person and subsequent feedback, to the participant.

* * * * *